United States Patent
Kamm

(10) Patent No.: US 11,627,259 B2
(45) Date of Patent: Apr. 11, 2023

(54) DEVICE, METHOD AND COMPUTER PROGRAM

(71) Applicant: Sony Corporation, Tokyo (JP)

(72) Inventor: Markus Kamm, Karlsruhe (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/072,032

(22) Filed: Oct. 16, 2020

(65) Prior Publication Data

US 2021/0127046 A1 Apr. 29, 2021

(51) Int. Cl.
*H04N 5/00* (2011.01)
*G01J 3/28* (2006.01)
*H04N 5/235* (2006.01)
*H04N 5/225* (2006.01)
*G06V 10/22* (2022.01)
*G06V 10/88* (2022.01)

(52) U.S. Cl.
CPC .......... *H04N 5/2352* (2013.01); *G01J 3/2823* (2013.01); *G06V 10/22* (2022.01); *G06V 10/88* (2022.01); *H04N 5/2254* (2013.01)

(58) Field of Classification Search
CPC .............................. H04N 5/2352; G01J 3/2823
USPC ........................................................ 348/135
See application file for complete search history.

(56) References Cited

U.S. PATENT DOCUMENTS

| 5,867,264 | A | 2/1999 | Hinnrichs |
| 7,652,765 | B1 | 1/2010 | Geshwind et al. |
| 2011/0081068 | A1* | 4/2011 | Brinks ................. G06T 11/005 382/132 |
| 2012/0092636 | A1* | 4/2012 | Van Der Mast .... G03F 7/70625 356/445 |
| 2012/0249821 | A1 | 10/2012 | Imai |
| 2014/0125860 | A1* | 5/2014 | Tofsted .................. G03B 7/085 348/349 |
| 2015/0178941 | A1* | 6/2015 | Banno ..................... G06T 7/277 382/103 |
| 2017/0082845 | A1* | 3/2017 | Chen .................. G02B 21/0048 |
| 2017/0105618 | A1* | 4/2017 | Schmoll ............. G01B 9/02044 |

FOREIGN PATENT DOCUMENTS

CN 105976618 A 9/2016

OTHER PUBLICATIONS

Kearney et al., "Imaging spectroscopy with digital micromirrors", total 10 pages, In Sensors and Camera Systems for Scientific, Industrial, and Digital Photography Applications, Proceedings of SPIE, vol. 3965, 2000.

* cited by examiner

*Primary Examiner* — Jeffery A Williams
(74) *Attorney, Agent, or Firm* — Xsensus LLP

(57) ABSTRACT

A device comprising a circuitry configured to obtain a sequence of digital images from an image sensor; select a region of interest within a digital image of the sequence of digital images; perform motion compensation on the region of interest to obtain a motion compensated region of interest based on motion information obtained from the sequence of digital images and a predefined accumulated time interval; define a mask pattern based on the compensated region of interest; apply the mask pattern to an electronic light valve.

22 Claims, 7 Drawing Sheets

DEVICE, METHOD AND COMPUTER PROGRAM

CROSS-REFERENCE TO RELATED APPLICATIONS

The present application claims priority to European Patent Application 19205039.1 filed in the European Patent Office on Oct. 24, 2019, the entire contents of which being incorporated herein by reference.

TECHNICAL FIELD

The present disclosure generally pertains to the field of spectral analysis, in particular to devices, methods and systems for spectral analysis in a specific region of interest.

TECHNICAL BACKGROUND

With a conventional spectrometer the average spectral intensity distribution of electromagnetic radiation passing a fixed aperture can be measured. Spectrometers sample the spectrum of light with a high spectral resolution, e.g. in steps of 1 nm or even less. Spectrometers bend the light beam into different angles, depending on its wavelength, and expand the light beam into its spectral components by use of a diffraction grating. The beam of light expanded into its spectral components can be captured and sampled by a linear (1-dimensional) photodetector array. There spectrometers measure the average spectral intensity distribution of the entire electromagnetic radiation passing a fixed aperture without any spatial resolution. Such spectrometers using a diffraction grating and a linear photodetector are commercially available from many suppliers.

Some spectrometers use a 2-dimensional photodetector array, where a line image can be spectrally analyzed with one shot to achieve a spatial resolution. With such spectrometers a 2-dimensional image can be spectrally analyzed by scanning the image line by line and analyzing each line time-sequentially. The drawback of such type of spectrometers is the requirement of a mechanically moving galvanic scanner (mirror) can be avoided by the device disclosed in this embodiment.

Conventional RGB cameras capture images of a scene in three different wavelength bands (red, green and blue) of the light reflected by the objects of a scene. The sensor of RGB cameras contains red, green and blue color filters which are arranged in a certain mosaic pattern (e.g. Bayer pattern) across the pixels of the sensor. The three spectral bands, R, G and B are sufficient to retrieve color information which is comparable to the color perception of the human eye. The filters of mosaic-type sensors, bloc the wavelength outside the filter band and have therefore a low spectral resolution. There exist multispectral cameras which have more (e.g. 10) color filters in separated or partially overlapping spectral bands. Other cameras have an additional filter in the near IR region (NIR, e.g. 750-1000 nm). With such information the normalized difference vegetation index (NDVI) can be measured NDVI=(NIR−R)/(NIR+R). This index distinguishes light reflected from live green plants from light reflected by other objects, like water or soil. For example it is measured by remote sensing cameras during earth observation, e.g. to estimate the biomass, the chlorophyll concentration in leaves or plant productivity. Hyperspectral cameras divide the spectrum seamlessly in narrow (<10 nm) bands, e.g. having 30 or even more color filters to divide the visible range between 400 nm and 700 nm into narrow spectral bands. All that mosaic type image sensors require demosaicking algorithms which interpolate the image between pixels of same spectral response, resulting in a trade-off between lateral- and spectral resolution.

Although there exist spectral analysis devices, it is desirable to provide devices, methods and computer programs which provide an improved spectral analysis for a specific spatial resolution.

SUMMARY

According to a first aspect, the disclosure provides a device comprising a circuitry configured to obtain a sequence of digital images from an image sensor; select a region of interest within a digital image of the sequence of digital images; perform motion compensation on the region of interest to obtain a motion compensated region of interest based on motion information obtained from the sequence of digital images and a predefined accumulated time interval; define a mask pattern based on the compensated region of interest; apply the mask pattern to an electronic light valve.

According to a second aspect, the disclosure provides a method which comprises obtaining a sequence of digital images from an image sensor; selecting a region of interest within a digital image of the sequence of digital images; performing motion compensation on the region of interest to obtain a motion compensated region of interest based on motion information obtained from the sequence of digital images and a predefined accumulated time interval; defining a mask pattern based on the compensated region of interest; applying the mask pattern to an electronic light valve.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
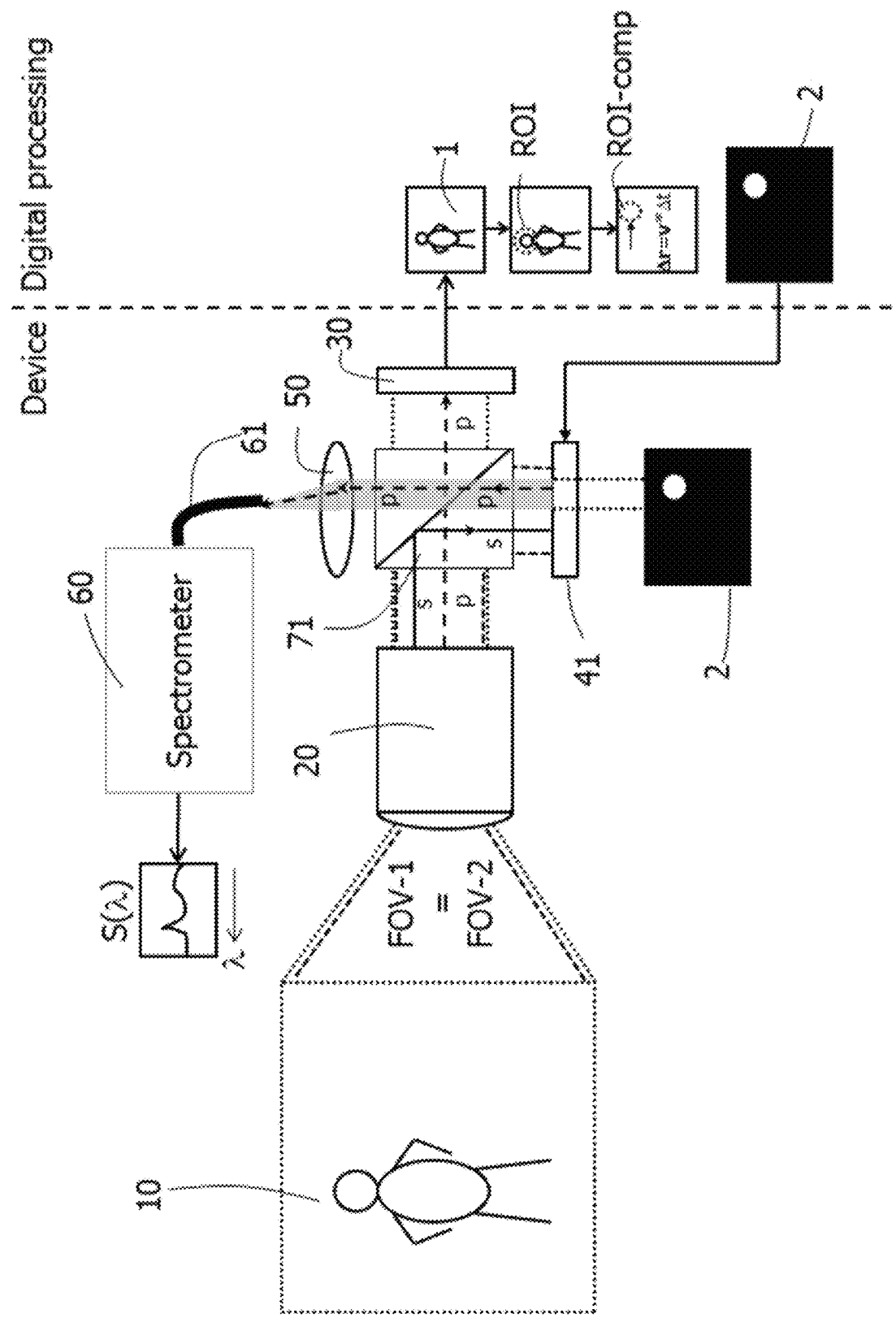
FIG. 1 shows a camera device with capability of spectral analysis with a common lens for the optical paths to the image sensor and the spectrometer, and using a reflective LCoS micro display as an electronic light valve.

The embodiments described below in more detail disclose a device comprising a circuitry configured to obtain a sequence of digital images from an image sensor; select a region of interest within a digital image of the sequence of digital images; perform motion compensation on the region of interest to obtain a motion compensated region of interest based on motion information obtained from the sequence of digital images and a predefined accumulated time interval; define a mask pattern based on the compensated region of interest; apply the mask pattern to an electronic light valve.

An image sensor is a sensor that detects and conveys information used to make an image. This is done by converting the variable attenuation of light waves into signals of current that convey the information. The waves can be light or other electromagnetic radiation. Used types are metal-oxide-semiconductor (MOS) devices, including the charge-coupled device (CCD) and the active pixel sensor (CMOS sensor), in complementary MOS (CMOS) or N-type MOS (NMOS or Live MOS) technologies.

Motion compensation may be an algorithmic technique used to predict a frame/image in a video/image sequence, given the previous and/or future frames/images by accounting for motion of the camera and/or objects in the video/image sequence.

According to the embodiments the device comprising circuitry may further be configured to obtain spectral intensity distribution data of light passing through the electronic light valve.

The spectral intensity distribution (or as also spectral power distribution) describes the power per unit area per unit wavelength of a emitting source. More general the term can also refer to the concentration, as a function of wavelength, of any radiometric or photometric quantity (e.g. radiant energy, radiant flux, radiant intensity, radiance etc).

According to the embodiments the device comprising circuitry may be configured to select the region of interest based on an object recognition and segmentation algorithm.

According to the embodiments the accumulated time interval may comprise a time delay caused by processing the digital image.

Digital image processing may be the use of computer algorithms to perform image processing on digital images. These algorithms may often need a lot of computing time and therefore the accumulated time interval may be dependent on the time delay due to the processing of the digital image.

According to the embodiments wherein the accumulated time interval may comprise a time delay caused by applying the mask pattern to the electronic light valve.

According to the embodiments wherein the accumulated time interval may comprise a time delay caused by capturing the digital image and by measuring spectral intensity distribution data of light passing through the electronic light valve.

According to the embodiments wherein the time delay may be caused by processing the digital image comprises a predefined detection time period which relates to the selection of the region of interest within the digital image, and a predefined compensation time period which relates to performing the motion compensation on the region of interest.

According to the embodiments wherein the time delay may be caused by applying the mask pattern to the electronic light valve comprises a predefined write time period, and a predefined rise time period.

According to the embodiments wherein the time delay may be caused by capturing the digital image comprises a predefined exposure time period, and a predefined readout time period, and where the time delay caused by measuring spectral intensity distribution data of light passing through the electronic light valve comprises an integration time period.

The predefined detection time period, the predefined compensation time period, the predefined write time period, the predefined rise time period, the predefined readout time period, the predefined integration time period and the predefined exposure time period are all predetermined time periods. They may be measured beforehand in an experiment or estimated using a model. They may be stored in the storage of the circuitry.

According to the embodiments wherein the accumulated time interval may be a time interval between a first time and a second time, and wherein the accumulated time interval is chosen such that the compensated region of interest at the second time covers congruently the same objects from the scene at the second time as the region of interest at the first time.

According to the embodiments wherein the circuitry may be configured to define the mask pattern based on the compensated region of interest by transforming the pixel information from a pixel space of the image sensor to a pixel space of the electronic light valve.

A pixel space may define the ordering of a number of pixels. For example in computer graphics that may be a raster graphics or bitmap image which is a dot matrix data structure that represents a generally rectangular grid of pixels (points of color), viewable via a monitor, paper, or other display medium. An image in a pixel space may be stored in image files with varying formats, like JPEG, PNG or the like.

According to the embodiments wherein the transformation of the compensated region of interest from a pixel space of the first image sensor to the pixel space of the electronic light valve, may involve one or more image processing operations such as padding, clipping, shifting, up/down sampling, up/down scaling or distortion compensation.

According to the embodiments the device may further comprise a first lens configured to focus incident electromagnetic radiation onto the image sensor, and a second lens configured to focus incident electromagnetic radiation onto the electric light valve.

The electromagnetic radiation may have any wavelength which can be transmitted by optical parts for example UV, VIS, NIR, IR, typically from 300 nm to 1700 nm.

According to the embodiments the device may further comprise a common lens configured to focus incident electromagnetic radiation onto the image sensor and onto the electric light valve.

According to the embodiments the device may further comprise a beam splitter configured to split the incident electromagnetic radiation from the common lens so that a first part of the split electromagnetic radiation is focused onto the image sensor and a second part of the split electromagnetic radiation is focused onto the electronic light valve.

A beam splitter may be an optical device that splits a beam of light into two beams. For example the beam splitter may have the geometrical shape of a cube that it is made from two triangular glass prisms which are glued together at their base using polyester, epoxy, or urethane-based adhesives.

According to the embodiments wherein electronic light valve may be a transmissive electronic light valve.

According to the embodiments wherein the transmissive electronic light valve may be transmissive liquid crystal micro-display.

According to the embodiments wherein the electronic light valve may be a reflective electronic light valve.

According to the embodiments wherein the reflective electronic light valve may be a reflective liquid crystal on silicon micro-display, or a digital mirror device.

The reflective liquid crystal on silicon micro-display (LCoS) may for example be the Sony SXRD.

According to the embodiments the device may further comprise a polarizing beam splitter configured to split the incident electromagnetic radiation from the common lens so that a first part of the of the split electromagnetic radiation, which is polarized in a first polarization state, is focused onto the image sensor and an second part of the split electromagnetic radiation, which is polarized in a second polarization state which is orthogonal to the first polarization state, is focused onto the reflective electronic light valve.

For example the first polarization state may be p-polarized and the second polarization state which is orthogonal to the first polarization state may then be s-polarized. In another example the first polarization state may be s-polarized and the second polarization state which is orthogonal to the first polarization state may then be p-polarized.

According to the embodiments wherein the reflective electronic light valve may be configured to convert the s-polarized second part of the split electromagnetic radiation into p-polarized electromagnetic radiation and reflect it back to the polarizing beam splitter.

According to the embodiments may further comprise a spectrometer, wherein the reflective electronic light valve and the spectrometer are located on opposite sides of the polarizing beam splitter.

According to the embodiments a method may comprise obtaining a sequence of digital images from an image sensor; selecting a region of interest within a digital image of the sequence of digital images; performing motion compensation on the region of interest to obtain a motion compensated region of interest based on motion information obtained from the sequence of digital images and a predefined accumulated time interval; defining a mask pattern based on the compensated region of interest; applying the mask pattern to an electronic light valve.

Embodiments are now described by reference to the drawings.

FIG. 1 shows a camera device with capability of spectral analysis with a common lens for the optical paths to the image sensor and the spectrometer, and using a reflective LCoS micro display as an electronic light valve. A common lens 20 is imaging electromagnetic radiation reflected from an object of a scene 10. The common lens 20 is adjusted in such a way that the electromagnetic radiation is focused onto the active areas of image sensor 30. A polarizing beam-splitter 71 behind the common lens 20 splits the electromagnetic radiation into s-polarized radiation and p-polarized radiation. The p-polarized component of the electromagnetic radiation behind the common lens 20 is transmitted in direction to the image sensor 30. The image sensor 30 captures a sequence of digital images 1 of the scene 10 starting at time t and provides it to a processor (not shown in FIG. 1, see CPU 501 in FIG. 6) for digital processing. The s-polarized component of the electromagnetic radiation behind the common lens 20 is reflected by the polarizing beam-splitter 71 in direction of a liquid crystal on silicon (LCoS) micro-display which in this embodiment realizes a reflective electronic light valve. On the surface of the LCoS micro display 41 a second image of the scene 10 is formed. The LCoS micro display 41 is controlled by digital processing to realize a mask pattern 2. According to the mask pattern 2, the LCoS micro display 41 reflects that part of the electromagnetic radiation which belongs to the open region of the mask pattern 2 as p-polarized light and that part which belongs to the blocking part of the mask pattern 2 as s-polarized light. The s-polarized reflected beam is reflected by the polarizing beam-splitter 71 in direction of the common lens 20 and gets lost (and is not used for the spectral analysis). The p-polarized reflected beam is traversing the polarizing beam-splitter 71 in direction to the spectrometer lens 50, were it is focused into the entrance aperture 61 (here a fiber optical cable) of the spectrometer 60. The electronic spectrometer 60 measures the spectral intensity distribution of the light entering the aperture at time t+Δt, and produces spectral intensity distribution data S(λ) which is output by the spectrometer 60. Accordingly, mask pattern 2 provided by the digital processing and realized by the LCoS micro display 41 thus defines the portion of the light reflected from the object 10, which enters the spectrometer 60 and which contributes to the spectral intensity distribution data S(λ) output by the spectrometer 60.

In the following, the digital processing which defines the mask pattern 2 by determination of a compensated region of interest is described in more detail. As described above the image sensor 30 captures a digital image 1 of the scene 10 at time t and provides it to a processor (not shown in FIG. 1, see CPU 501 FIG. 6) for digital processing. An object recognition and segmentation algorithm automatically selects a region of interest ROI within the electronic image 1. A motion compensation algorithm performs a motion compensation on the region of interest ROI to obtain a motion compensated region of interest ROI-comp based on motion information obtained from a sequence of digital images 1 obtained by the image sensor 30. The compensated region of interest ROI-comp defines the mask pattern 2 realized by the LCoS micro display 41. The mask pattern 2 thus shows an image of the motion compensated region of interest ROI-comp. The mask pattern is implemented by the LCoS micro display 41 such that pixels of the LCoS micro display 41 within the motion compensated region of interest ROI-comp are controlled to change the polarization state of light from s-polarized into p-polarized after being reflected, whereas pixels of the LCoS micro display 41 outside the motion compensated region of interest ROI-comp are controlled to keep the polarization of light state s-polarized after being reflected. Accordingly, the motion compensated region of interest ROI-comp defines the portion of the light reflected from the object 10, which enters the spectrometer 60 and which contributes to the spectral intensity distribution data S(λ) output by the spectrometer 60.

Other than conventional spectrometers which measure the average spectral intensity distribution of the entire electromagnetic radiation passing a fixed aperture, the device disclosed in this embodiment of FIG. 1 combines the high spatial resolution of an RGB (or monochrome) camera with the high spectral resolution of a spectrometer by capturing in a first step an image 1 of the scene 10, whereby the image can be an RGB image, monochrome image, or an image with any kind of spectral filter combinations, including infrared (IR) filters. Based on the digital processing described above, the device in this embodiment selects dynamically a specific region of interest ROI within the scene 10. In a second step the spectral intensity distribution data S(λ) of electromagnetic radiation coming from that specific region of interest ROI (respectively the compensate ROI-comp) is measured.

In the embodiment of FIG. 1, an object recognition and segmentation algorithm automatically selects a region of interest ROI within the electronic image 1. In general the region of interest ROI can be any region within the 2-dimensional image 1 that is identified by the object recognition and segmentation algorithm. The region may not necessarily be a connected region, but the region of interest ROI may also include a sum of not connected regions. An object recognition algorithm deals with detecting instances of semantic objects of a certain class (such as humans, faces, buildings, or cars) in digital images and videos. This may for example be realized using machine learning techniques like the Viola Jones object detection framework or a scale-invariant feature transform (SIFT) or this may also be realized using deep neural network approaches like Region Proposal Networks or a Single Shot MultiBox Detector. After detecting the objections within the image, a segmentation algorithm may be applied in order to segment the region of interest. A segmentation algorithm in that regard deals with the process of assigning a label to every pixel in an image such that pixels with the same label share certain characteristics and thereby typically objects and boundaries (lines, curves, etc.) in images are located. This may for example be realized by clustering methods like the K-means algorithm, compression-based methods, edge detection methods or region-growing methods. It should however be noted that according to alternative embodiments, the selection of the ROI could be performed manually by user interaction. For example a person appearing in the scene 10 is captured in digital image by image sensor 30. The digital image is sent to via the display interface 510 from the processor (see FIG. 5) to a screen display, for example a touch screen display, where a user may then select a certain part of the person from the scene 10 that defines the region of the interest.

The motion compensation algorithm which generates the motion compensated region of interest ROI-comp from the region of interest ROI is configured to correct a potential displacement of an object at which the ROI is directed during time interval Δt between capturing a digital image 1 of the object and the time t+Δt at which its spectral intensity distribution data S(λ) (spectral reflectance) is determined by the spectrometer 60. In case of non-static scenes 10, like a moving person or objects on a moving conveyor belt, the image of an object on the image sensor 30 is moving. Using subsequent digital images 1 captured by the image sensor 30, the motion compensation algorithm determines a motion vector field v of the region of interest ROI selected in the digital image. This motion vector field v represents the optical flow in the digital image, respectively in the region of interest ROI. Any methods for determining optical flow known to the skilled person in the field of machine vision may be used for determining the motion vector field v, e.g. phase correlation techniques, block-based methods, differential methods, or discrete optimization methods, such as used in video technology like MPEG. Based on this motion vector field, the motion compensation algorithm generates the motion compensated region of interest ROI-comp. This may for example be realized by applying the motion vector field v to the region of interest ROI in a pixel-wise manner, e.g. by determining, for each pixel in the region of interest, a displacement $\Delta r = v \cdot \Delta t$ based on the motion vector field v and based on the time interval Δt between capturing the digital image 1 in which the region of interest ROI has been determined and the time t+Δt at which its spectral intensity distribution data S(λ) (spectral reflectance) is determined by the spectrometer 60, i.e. under consideration and shifting of the region of interest ROI along that motion vectors. Thereby, it is ensured that the compensated region of interest ROI-comp at time t+Δt which defines the portion of light input to the spectrometer 60 covers congruently the same objects within the scene 10 as the region of interest ROI at time t obtained from the image 1 captured by the image sensor.

The light path of the p-polarized component of the electromagnetic radiation behind the common lens 20 which is focused onto the active area of the image sensor 30 is related to a first field of view FOV-1 of the camera device and the light path of the s-polarized component of the electromagnetic radiation behind the common lens that is reflected to the electronic light valve 41 is related to a second field of view FOV-2 of the camera device. It is assumed in this embodiment that the FOV-1 and the FOV-2 are identical and therefore the mask pattern 2 (and therefore the compensate region of interest ROI-comp) does not have to be scaled up or down in order to match. Furthermore, because of the use of a common lens, there is no need for a correction of any geometrical distortions caused by the common lens, because any distortion would be applied to both images.

In the embodiment of FIG. 1 an electronic light valve is realized as LCoS micro display 41. In alternative embodiment, the electronic light valve can also be realized by a reflective digital mirror device (DMD) or by a mirror, which is reflective within the region of interest and absorbing (black) outside the region of interest. An additional quarter wave plate or foil attached to the mirror converts the s-polarized component of the electromagnetic radiation beam into p-polarized after being reflected by the mirror.

In the embodiment of FIG. 1 the electromagnetic radiation that was focused onto the image sensor was p-polarized and the electromagnetic radiation that is focused onto the reflective electronic light valve (41) was s-polarized. In an alternative embodiment the polarizing beam splitter (71) can also split the incident electromagnetic radiation from the common lens (20) so that the first part of the split electromagnetic radiation that is focused onto the image sensor (30) is polarized in a first polarization state, other than p-polarized, and the second part of the split electromagnetic radiation which is focused onto the reflective electronic light valve (41) is polarized in a second polarization state, other than s-polarized, which is orthogonal to the first polarization state.

As stated above, in the embodiment of FIG. 1, the LCoS micro display 41 is controlled by digital processing to realize the mask pattern 2 which is defined by the compensated region of interest ROI-comp. A recognition and segmentation algorithm assigns a respective label to every pixel in image 1 such that pixels with the same label share certain characteristics and thereby typically objects and boundaries (lines, curves, etc.) in images are located. Based on the respective label attributed to a pixel and based on configuration information which defines the interest in specific objects, it is decided for each pixel whether or not it belongs to the compensated region of interest ROI-comp. This is explained in more detail below.

Figure 2:
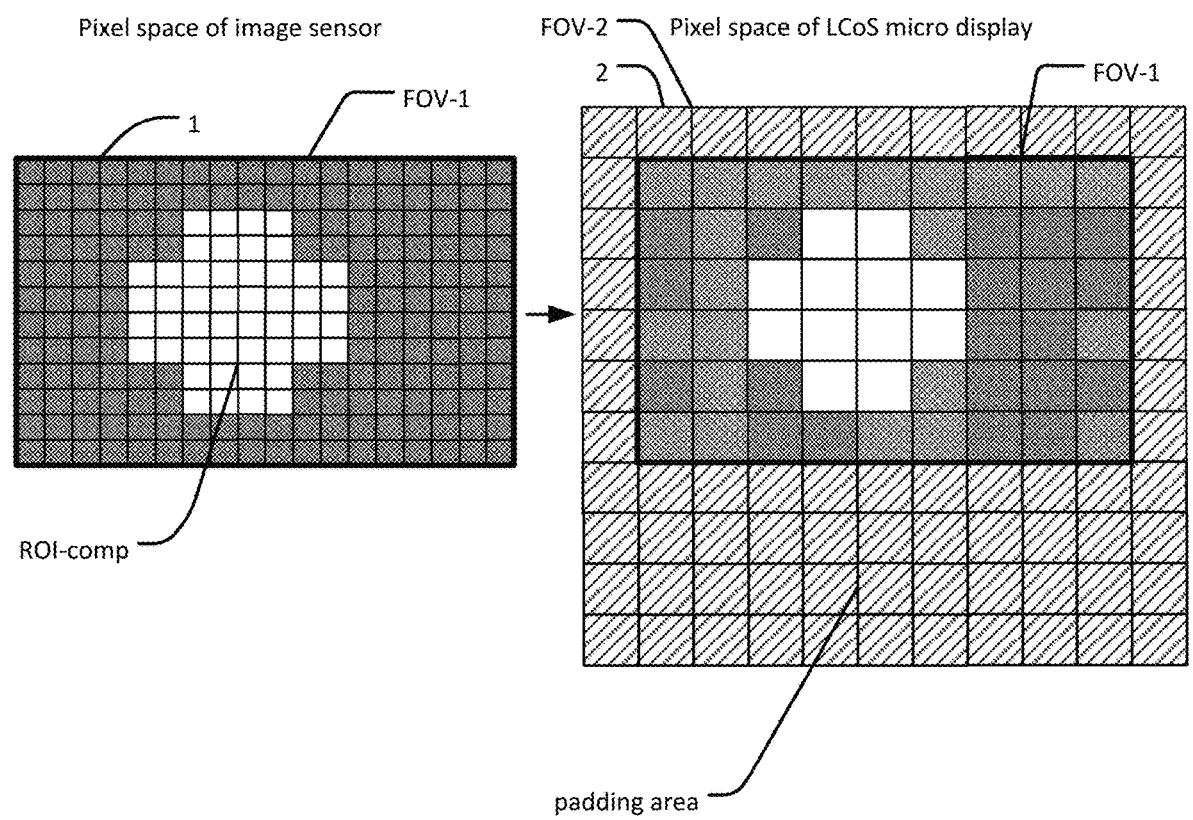
FIG. 2 shows a transformation of the compensated region of interest from the pixel space of the image sensor into the pixel space of the LCoS micro display to obtain the mask pattern.

FIG. 2 shows a transformation of the compensated region of interest ROI-comp from the pixel space of the image sensor 30 into the pixel space of the LCoS micro display 41 to obtain the mask pattern 2. The left side of FIG. 2 shows image 1 represented as a bitmap in the pixel space of image sensor 30. The field of view FOV-1 is defined by focal length of the lens 20 and the surface area of the image sensor 30. Each pixel in image 1 is associated with a binary information indicating whether or not the pixel belongs to the compensated region of interest ROI-comp, wherein the pixels that belong to the compensated region of interest ROI-comp are marked as "true" (white pixels) and the pixels that do not belong to the compensated region of interest ROI-comp are marked as "false" (shaded pixels). The image sensor 30 has a resolution which is given by the number of pixels in row direction times the number of pixels in column direction. By transforming the compensated information of interest ROI-comp is transformed from the pixel space of image sensor 30 to the pixel space of the LCoS micro display, a mask pattern 2 is obtained, which is shown on the right side in FIG. 2. The mask pattern 2 defines how the pixels of the LCoS micro display control the polarization state of the light being reflected, assigning binary information to each pixel in the LCoS micro display. Each pixel information in the mask pattern 2 controls the polarization state of the light being reflected at a respective pixel of the LCoS micro display 41. That means, a pixel which is identified as "true" is attributed an information that corresponds to changing the polarization state of light being reflected from that pixel from s-polarized to p-polarized, and a pixel that is identified with "false" is attributed an information that corresponds to keep the polarization state of light being reflected from that pixel s-polarized. By the transformation from the pixel space of the image sensor 1 to the LCoS micro display 41, the pixels of the mask pattern 2 that fall inside the transformed compensated region of interest ROI-comp (white pixels) are assigned with the binary information "true" which corresponds to changing the polarization state (as explained above to p-polarized), and the pixels of the mask pattern 2 that fall outside of the transformed compensated region of interest ROI-comp (shaded pixels) are assigned with the binary information "false" which corresponds to keeping the polarization state of the reflected light unchanged. Accordingly, the mask pattern 2 realized by the LCoS micro display 41 thus defines, based on the information of the compensated region of interest ROI-comp, the portion of the light reflected from the object 10, which enters the spectrometer 60 and which contributes to the spectral intensity distribution data S(λ) output by the spectrometer 60.

The LCoS micro display 41 has a resolution which is given by the number of pixels in row direction times the number of pixels in column direction. In this embodiment, the resolution of the LCoS micro display 41 is smaller than the resolution of the image sensor 30. Therefore, by transforming the compensated region of interest ROI-comp from the pixel space of the image sensor 30 into the pixel space of the LCoS micro display to obtain the mask pattern 2 the resolution is sampled down to the resolution of LCoS micro display by downsampling (if the LCoS resolution is higher an upsampling is performed).

In the case of the embodiment of FIG. 1, the field of view FOV-2 of the LCoS micro display 41 and the field of view FOV-1 of the image sensor 30 are identical so that no clipping or padding operations are necessary to transform the compensated region of interest ROI-comp from the pixel space of the image sensor 30 to the pixel space of the LCoS micro display 41. In the embodiment of FIG. 2, however, it is shown the case in which the field of view FOV-2 of the LCoS micro display 41 is bigger than the field of view FOV-1 of the image sensor 30 (such as in the embodiments of FIGS. 3 and 4). In FIG. 2, the field of view FOV-1 of the image sensor 30 is displayed in the pixel space of the LCoS micro display a solid box. By definition, the surface area and the focal length of the lens 20 of the LCoS micro display define the field of view FOV-2. Due to the difference in the fields of view FOV-1 and FOV-2, the transformation of the compensated region of interest ROI-comp from the pixel space of the image sensor 30 into the pixel space of the LCoS micro display 41 to obtain the mask pattern 2 involves a padding operation, i.e. the pixels in LCoS micro display that are outside of the smaller field of view FOV-1 of the image sensor are not defined in the pixel space of the image sensor 1. These pixels are marked as padding area (in FIG. 2 illustrated as dashed pixels). The pixels within the padding area (dashed pixels) are assigned with the predefined binary information "false", i.e. they are treated as not belonging to the compensated region of interest ROI-comp.

In the embodiment of FIG. 2 it is shown the case in which the field of view FOV-2 of the LCoS micro display 41 is bigger than the field of view FOV-1 of the image sensor 30 (such as in the embodiments of FIGS. 3 and 4) so that padding has to be applied when transforming the compensated region of interest ROI-comp to the pixel space of the LCoS micro display. In the opposite case in which the field of view FOV-2 of the LCoS micro display 41 is smaller than the field of view FOV-1 of the image sensor 30, a clipping operation is applied. That is, pixels from the pixel space of the LCoS micro display which are mapped to a location outside the field of view FOV-2 of the LCoS micro display during the transformation are dismissed.

Figure 4:
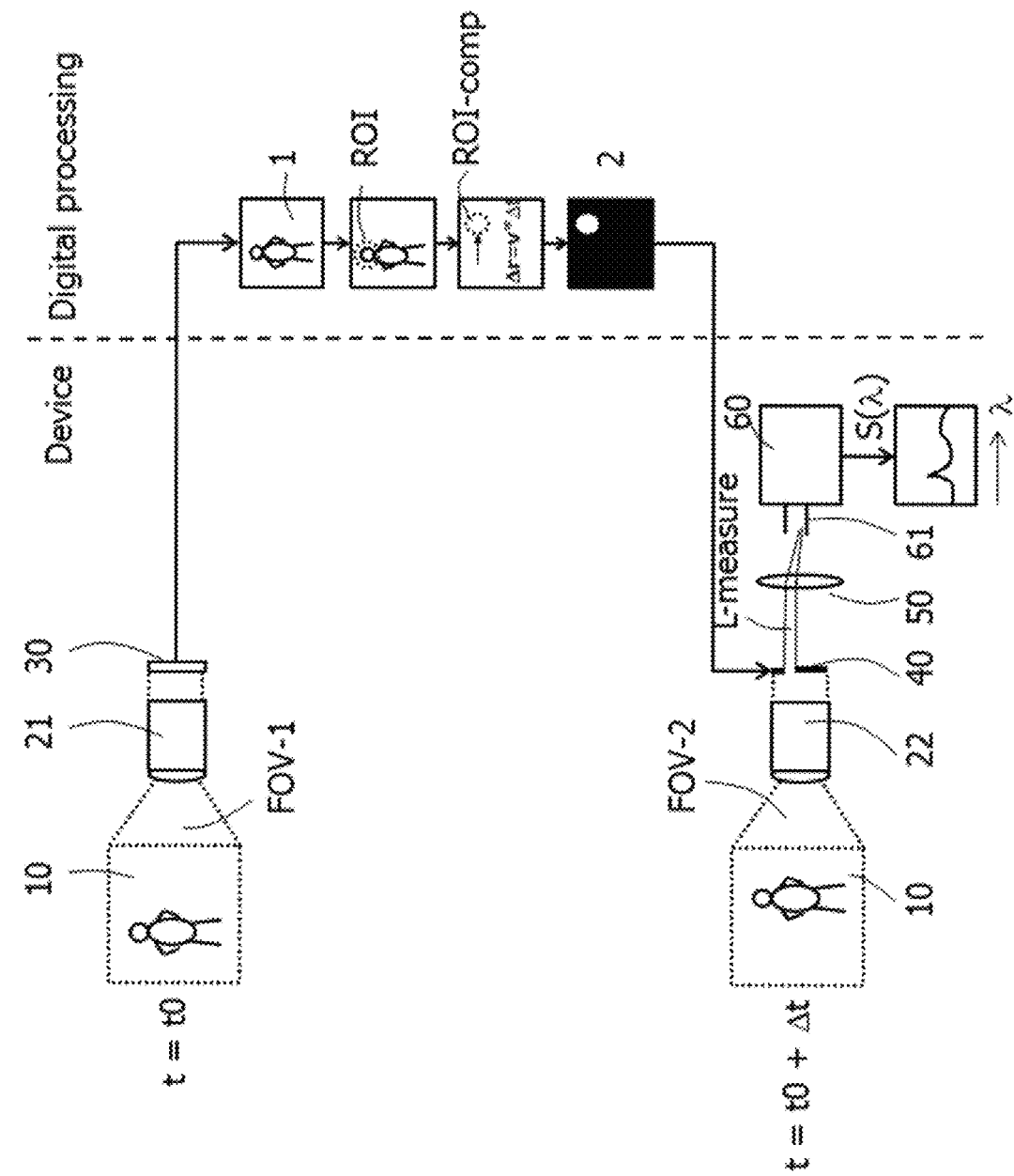
FIG. 4 shows a camera device with capability of spectral analysis with two different lenses using a transmissive electronic light valve.

Still further, in the case of the embodiment of FIG. 4 shown below, where two different lenses, lens 21 for the image sensors 20, and lens 22 for the T-LCD 40 (electronic light valve), an additional shift operation is applied to compensate the disparity caused by the baseline offset between the first lens 21 and the second lens 22 and to match the bitmaps to each other. Further, any geometrical distortions caused by the first lens 21 and the second lens 22 may be compensated (e.g. based on lens profiles that define the optical characteristics of the lenses).

Figure 3:
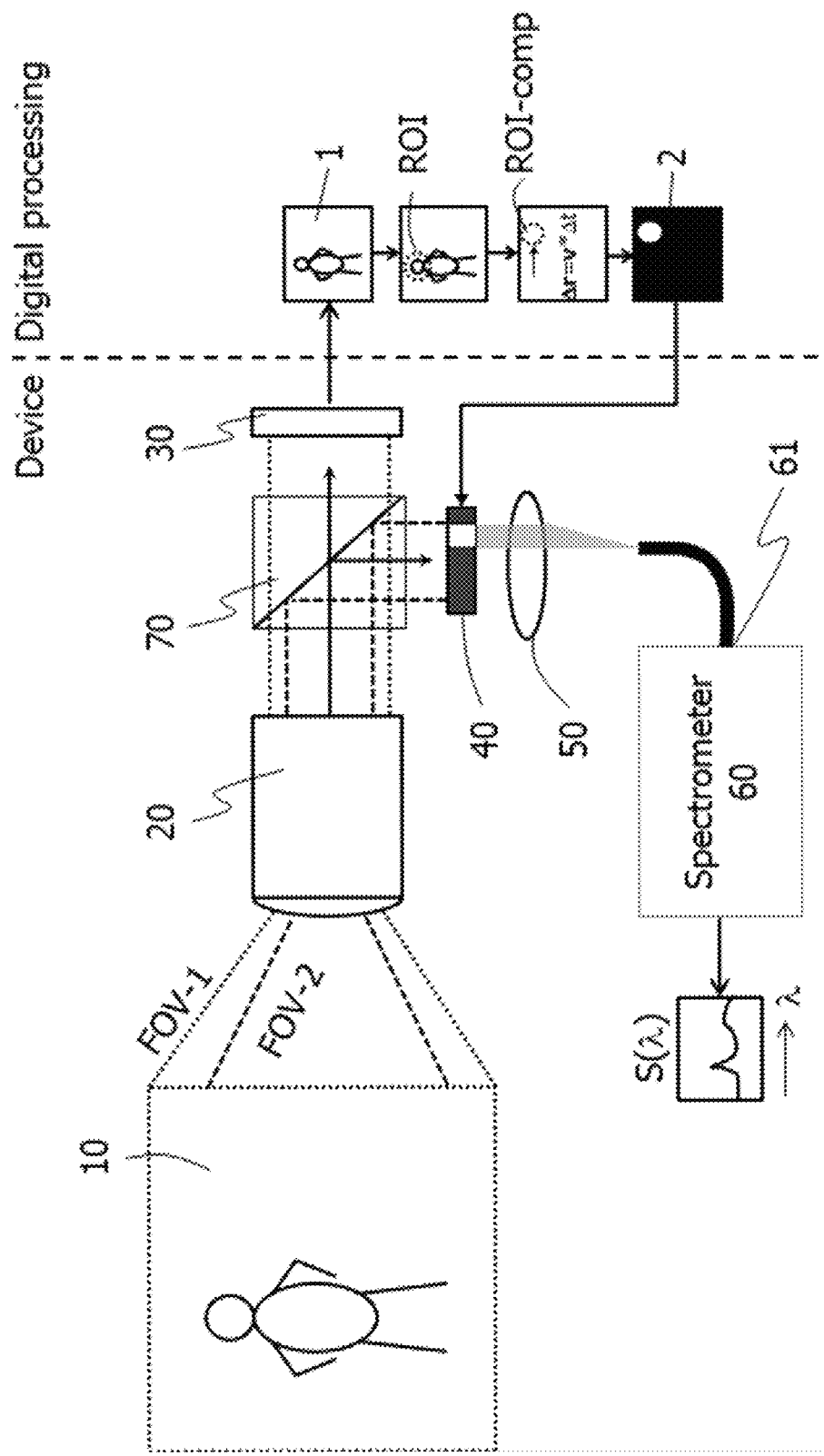
FIG. 3 shows a camera device with capability of spectral analysis with a common lens for the optical paths to the image sensor, the spectrometer using a transmissive T-LCD as an electronic light valve.

FIG. 3 shows a camera device with capability of spectral analysis with a common lens and using a transmissive T-LCD as an electronic light valve. Whereas in the embodiment of FIG. 1 a camera device with capability of spectral analysis uses a reflective LCoS micro display as an electronic light valve, in the embodiment of FIG. 3, the camera device uses a transmissive liquid crystal micro-display (T-LCD) to realize an electronic light valve which determines the portion of the light which enters a spectrometer 60 and which contributes to the spectral intensity distribution data S(λ) output by the spectrometer 60.

A common lens 20 is imaging the electromagnetic radiation reflected from the objects of the scene 10. The common lens 20 is adjusted in such a way that the electromagnetic radiation is focused onto the active areas of image sensor 30. A beam-splitter 70 behind the common lens 20 splits the electromagnetic radiation into a component that is transmitted in direction to the image sensor 30 and a component that is transmitted in direction of the electronic light valve 40. The image sensor 30 captures a digital image 1 of the scene 10 at time t and provides it to a processor (not shown in FIG. 1, see CPU 501 in FIG. 6) for digital processing. The component of the electromagnetic radiation that is reflected by the beam-splitter 70 in direction of a transmissive liquid crystal micro-display (T-LCD), which realizes an electronic light valve, finally hits the T-LCD 40. On the surface of the T-LCD 40 a second image of the scene 10 is formed. The T-LCD 40 is controlled by digital processing to realize a mask pattern 2. According to the mask pattern 2, the T-LCD 40 allows a part of the component of the electromagnetic radiation that is reflected by the beam-splitter 70 to pass through indirection to the spectrometer lens 50, were it is focused into the entrance aperture 61 (here a fiber optical cable) of the spectrometer 60. Accordingly, the mask pattern 2 provided by the digital processing and realized by the transmissive T-LCD 40 thus defines the portion of the light reflected from the object 10, which enters the spectrometer 60 and which contributes to the spectral intensity distribution data S(λ) output by the spectrometer 60.

The digital processing which defines the mask pattern 2 in the embodiment of FIG. 3 is the same as the digital processing described with regard to the camera device of FIG. 1 which uses a reflective LCoS micro display as an electronic light valve. The motion compensated region of interest ROI-comp determined by the digital signal processing defines the portion of the light reflected from the object 10, which enters the spectrometer 60 and which contributes to the spectral intensity distribution data S(λ) output by the spectrometer 60.

The light path of component of the electromagnetic radiation behind the common lens 20 which is focused onto the active area of the image sensor 30 is related to a first field of view FOV-1 of the camera device and the light path of the component of the electromagnetic radiation behind the common lens 20 that is reflected to the electronic light valve 40 is related to a second field of view FOV-2 of the camera device. As indicated by the dotted and dashed lines representing FOV-1 and, respectively FOV-2, in the embodiment of FIG. 3 the active area of the image sensor 30 and electronic light valve 40 might be non-identical and therefore the field of views FOV-1 of the image sensor 30 and the field of view FOV-2 of the electronic light valve 40 might be different. Therefore, when calculating the compensated region of interest ROI-comp the mask pattern 2 (and therefore the compensate region of interest ROI-comp) a clipping or padding operation is applied in order to match. However, because of the use of a common lens, there is no need for a correction of any geometrical distortions caused by the common lens, because any distortion would be applied to both images.

FIG. 4 shows a camera device with capability of spectral analysis with two different lenses for the optical paths to the image sensor and the spectrometer, and using a transmissive liquid crystal micro-display (T-LCD) as an electronic light valve. Whereas in the embodiment of FIGS. 1 and 2 a camera device with capability of spectral analysis uses a common lens, in the embodiment of FIG. 3, the camera device uses two different lenses.

In this embodiment a first lens 21 is imaging the electromagnetic radiation reflected from the objects of the scene 10 at time t and focused onto the image sensor 30 to create an electronic image 1 of the scene 10. The system of the first lens 21 and the image sensor 30 envelop a first field of view FOV-1. Further, in this embodiment the electromagnetic radiation that is analyzed by the spectrometer is captured with a second lens 22 which focuses the electromagnetic radiation at the time t+Δt onto a transmissive liquid crystal micro-display (T-LCD) 40 which realizes an electronic light valve. The system of the second lens 22 and the electronic light valve 40 envelop a second field of view FOV-2. The image sensor 30 captures a digital image 1 of the scene 10 at time t and provides it to a processor (not shown in FIG. 1, see CPU 501 in FIG. 6) for digital processing. The electromagnetic radiation that is focused by the lens 22, is focused onto the T-LCD 40. On the surface of the T-LCD 40 a second image of the scene 10 is formed. The T-LCD 40 is controlled by digital processing to realize a mask pattern 2. According to the mask pattern 2, the T-LCD 40 allows a part of the component of the electromagnetic focused by the lens 22 to pass through in direction to the spectrometer lens 50, were it is focused into the entrance aperture 61 (here a fiber optical cable) of the spectrometer 60. Accordingly, mask pattern 2 provided by the digital processing and realized by the transmissive T-LCD 40 thus defines the portion of the light reflected from the object 10, which enters the spectrometer 60 and which contributes to the spectral intensity distribution data S(λ) output by the spectrometer 60.

In the following, the digital processing which defines the mask pattern 2 is described in more detail. As described above the image sensor 30 captures a digital image 1 of the scene 10 at time t and provides it to a processor (not shown in FIG. 1, see CPU 501 FIG. 6) for digital processing. An object recognition and segmentation algorithm automatically selects a region of interest ROI within the electronic image 1. A motion compensation algorithm performs a motion compensation on the region of interest ROI to obtain a motion compensated region of interest ROI-comp based on motion information obtained from a sequence of digital images 1 obtained by the image sensor 30. The compensated region of interest ROI-comp defines the mask pattern 2 realized by the transmissive T-LCD 40. The mask pattern 2 thus shows an image of the motion compensated region of interest ROI-comp. In this embodiment, because of the two different lenses, 21 with the image sensors 20, and 22 with electronic light valve 40, and the different field of views of, the mask pattern 2 and therefore the compensate region of interest ROI-comp has to be scaled up or down in order to match. Additionally the mask pattern 2 has to be warped in order to compensate the possible different geometrical distortions between the first lens 21 and the second lens 22. Furthermore, the mask pattern 2 has to be shifted to compensate the disparity caused by the baseline between the first lens 21 and the second lens 22. The mask pattern is implemented by the T-LCD 40 such that pixels of the T-LCD within the motion compensated region of interest ROI-comp are controlled to be transmissive, whereas pixels of the T-LCD outside the motion compensated region of interest ROI-comp are controlled to be non-transmissive. Accordingly, the motion compensated region of interest ROI-comp defines the portion of the light reflected from the object 10, which enters the spectrometer 60 and which contributes to the spectral intensity distribution data S(λ) output by the spectrometer 60. The electronic spectrometer 60 measures the spectral intensity distribution of the light entering the aperture at time t+Δt, coverts the captured electromagnetic radiation (photo-electrons) into digital numbers, calibrates the data and outputs the spectral intensity distribution data.

The recognition and segmentation algorithms that are used in the context of the embodiment of FIG. 4 to determine a region of interest ROI may be the same as described above with regard to the embodiment of FIG. 1. Still further, as in the embodiment of FIG. 1, a motion compensation algorithm which acts on the region of interest ROI obtained by the recognition and segmentation algorithm ensures that a compensated region of interest ROI-comp at time t+Δt which defines the portion of light input to the spectrometer 60 covers congruently the same objects within the scene 10 as the region of interest ROI at time t obtained from the image 1 captured by the image sensor.

Figure 5:
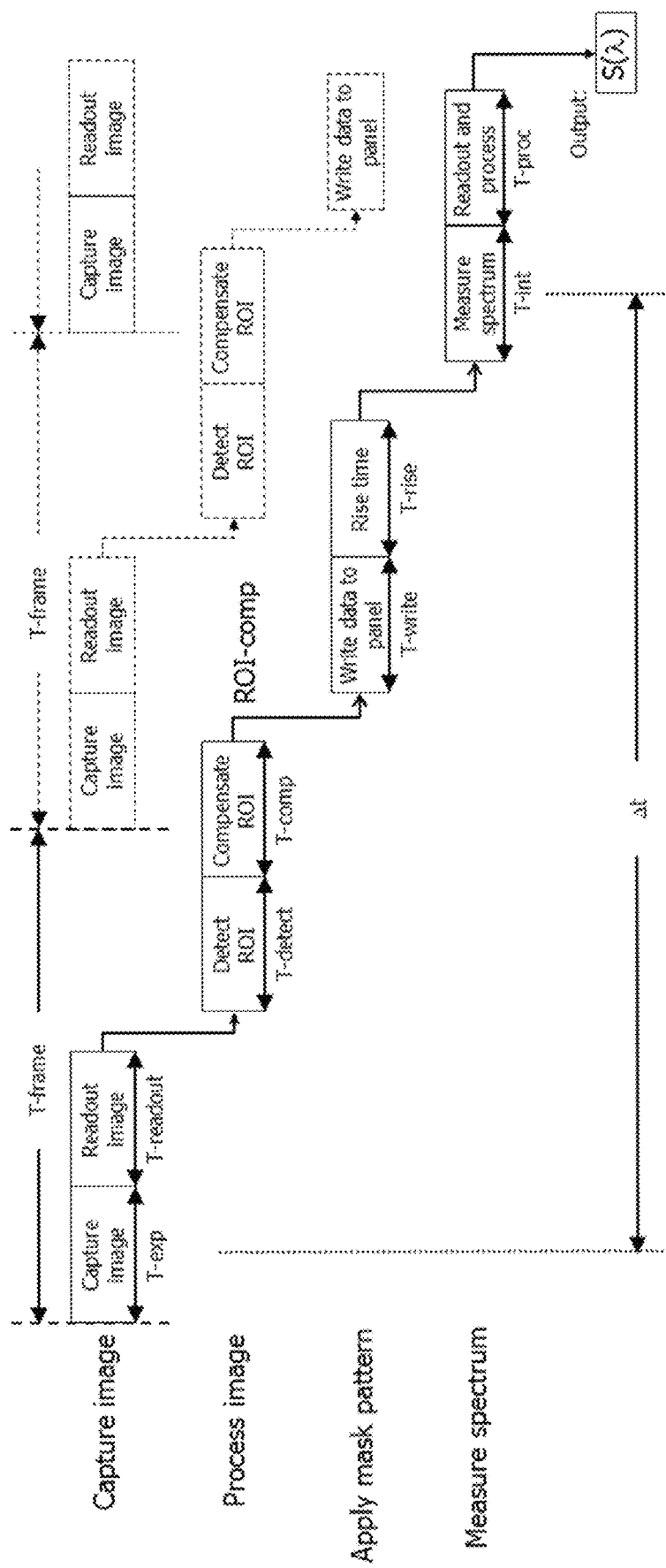
FIG. 5 shows a timing diagram visualizing the process of performing spectral analysis in a selected region of interest with the device from FIG. 1, FIG. 2 or FIG. 3.

FIG. 5 shows a timing diagram visualizing the process of performing spectral analysis in a selected region of interest with the device of FIG. 1, FIG. 3 or FIG. 4. A sequence of images 1 is captured with a frame rate 1/T-frame, where T-frame is the length of a frame in time. For each frame, the process comprises three stages, namely a capturing of the image, a processing of the image, and a measuring of the spectrum based on processed image. In order to process a sequence of several images the process described below is repeated, as represented by the process steps indicated by dashed lines, i.e. the process starts again after one length frame time T-frame processing a new frame. In the stage of capturing an image, an image 1 is captured during a exposure time period T-exp, which is the exposure time of the sensor 30. After capturing the image 1, the image 1 is read out during time period T-readout, which is the time for converting the captured electromagnetic charge (photo-electrons) by the sensor 30 into digital numbers and storing the image into a frame memory. Next, in the image processing stage, the process proceeds with detecting a region of interest ROI within the image 1 captured during the exposure time period T-exp and read-out during read-out time period T-readout. The detection time period T-detect is the time period needed by the processor to detect the region of interest ROI, i.e. to recognize and segment object(s). Next, the process proceeds with determining a compensated region of interest ROI-comp based on the region of interest ROI and based on motion information determined for the region of interest ROI. The compensation time period T-comp is the time period needed by the processor to calculate the compensated region of interest ROI-comp. Next, the process proceeds with writing the mask pattern 2 defined by the compensated region of interest ROI-comp into the electronic light valve (L-COS, T-LCD, DMD, or the like) 40, 41. The write time period T-write is the time needed by the processor to write the mask pattern 2 to the electronic light valve 40, 41. After writing the mask pattern 2 to the electronic light valve 40, 41, the mask pattern 2 is physically realized in the electronic light. The rise time period T-rise is the time needed until the mask pattern 2 is physically realized in the electronic light valve 40, 41. Next, in the spectrum measuring stage, the process proceeds with measuring the spectrum of the light that passes through the mask pattern 2 realized the electronic light valve 40, 41. The integration time period T-int is the integration time needed by the spectrometer 60 to collect the electromagnetic radiation whose spectrum should be analyzed. Next, the process proceeds with reading out the spectrum and processing the spectrum obtained by spectrometer 60 to produce the spectral intensity distribution data $S(\lambda)$. The processing time period T-proc is the time needed to convert the captured photo-electrons in the spectrometer 60 into digital numbers and to process that data into calibrated spectral intensity distribution data $S(\lambda)$.

In FIG. 5, the accumulated time interval $\Delta t$ between capturing a digital image 1 of the object and the time $t+\Delta t$ at which its spectral intensity distribution data $S(\lambda)$ is determined is indicated. The motion compensation process which happens during the process of determining the compensated region of interest ROI-comp takes this accumulated time interval $\Delta t$ into consideration to ensure that the compensated region of interest ROI-comp at time $t+\Delta t$ which defines the portion of light input to the spectrometer 60 covers congruently the same objects within the scene 10 as the region of interest ROI at time t obtained from the image 1 captured by the image sensor. According to the timing diagram of FIG. 5, the time accumulated interval $\Delta t$ can be calculated based on the exposure time period T-exp, the readout time period T-readout, the detection time period T-detect, the write time period T-write, the rise time period T-rise, and the integration T-int, in particular, in particular by accumulating these time periods. For example, the time interval $\Delta t$ can be accumulated based the exposure time period T-exp, the readout time period T-readout, the detection time period T-detect, the write time period T-write, the rise time period T-rise, and the integration T-int as $$\Delta t = T\text{-exp}/2 + T\text{-readout} + T\text{-detect} + T\text{-comp} + T\text{-write} + T\text{-rise} + T\text{-int}/2.$$

In this example, the exposure time period T-exp and the integration time period T-int attribute to the accumulation of the accumulated time interval $\Delta t$ with a factor of ½. This is because the image capturing of the image does not happen at a unique point in time but extends over the exposure time interval T-exp so that one can assume the center of the exposure time interval T-exp to represent an intermediate time point at which the image capturing happens. Likewise, the integration of the spectrum does not happen at a unique point in time but extends over the integration time interval T-int so that one can assume the center of the integration time interval T-int to represent an intermediate time point at which the capturing of the spectrum happens.

Applications

Potential application fields of the device disclosed in FIG. 1, FIG. 2 or FIG. 3 are for example in the field of precision farming in agriculture/horticulture, Surgery, medical tissue and skin examination, food inspection, food sorting machines, recycling sorting plants, biometric sensing, counterfeit detection or skin cosmetics.

For example the degree of ripeness of fruits can be determined by measuring the spectral reflectance of the fruit. In that case an image of the plant is taken and the part of the image showing the fruit(s) is selected as region of interest and the average spectral intensity distribution of the electromagnetic radiation within the region of interest is measured by a spectrometer.

In another example the vein pattern of the hand of a person should be detected in order to identify that person. For this purpose an image of the hand is captured by an IR sensor, the vein pattern is selected by a segmentation algorithm automatically as region of interest and the spectral pattern of the veins (blood) is measured by a spectrometer in order distinguish the real hand of a human from a printed or displayed image of that hand.

In another example the face of a person is captured in order to identify that person by a face identification algorithm. The skin of the face is segmented as region of interest and the spectral reflectance of region of interest is measured by a spectrometer in order to authenticate real skin.

In another example an image of human tissue is captured by an endoscope during surgery and suspicious spots on the tissue are segmented as region of interest and analyzed by the spectrometer for further examination.

Figure 6:
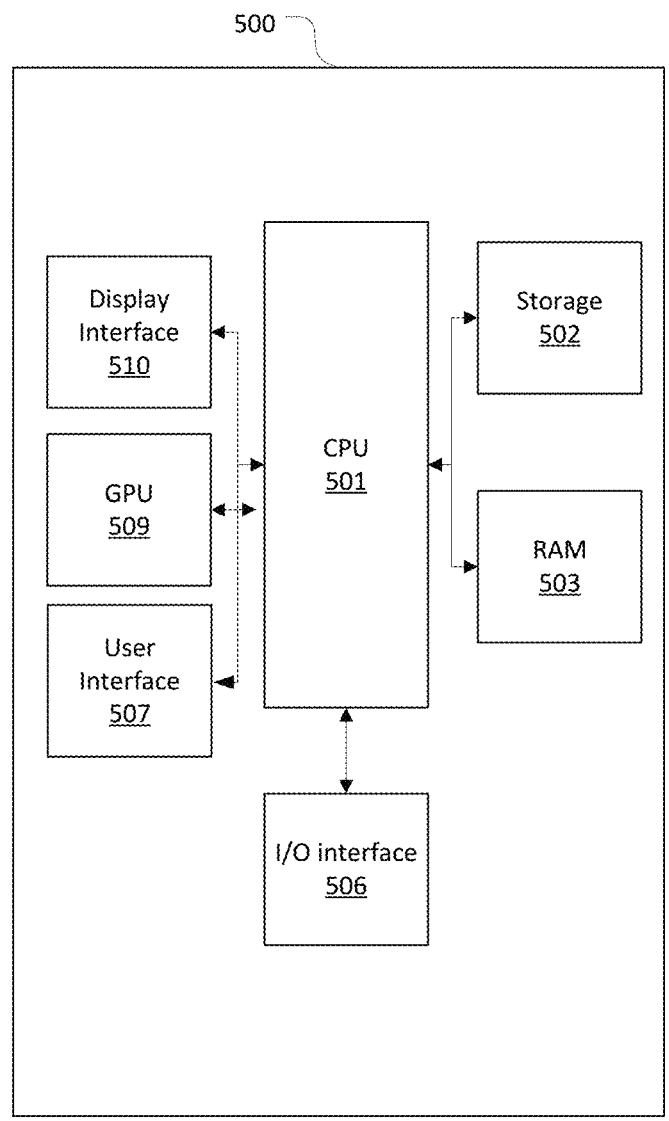
FIG. 6 schematically describes an embodiment of a circuitry which may implement the processor that controls the electronic light valve.

In a further example waste on a conveyor belt is captured by a camera and the objects under consideration are segmented as different regions of interest. These different regions of interest are then analyzed time-sequentially by a spectrometer in order to distinguish different materials, e.g. plastic materials, metals or the like Implementation FIG. 6 schematically describes in more detail an embodiment of circuitry which comprises a processor which may implement the digital processing which defines a mask pattern for an electronic light valve by determination of a compensated region of interest. The circuitry 500 comprises a CPU 501 as processor. The circuitry 500 further comprises a data storage 502 and a data memory 503 (here a RAM). The data memory 503 is arranged to temporarily store or cache data or computer instructions for processing by the processor 501. The data storage 502 may also store data obtained by a reduced-computation artificial neural network. The data storage 502 is arranged as a long term storage, e.g., for images or that are captured from by image sensor 30 or spectral analysis results calculated be the spectrometer 60. The circuitry 500 further comprises a GPU 509 that is connected to the processor 501. The electronic system 500 further comprises an I/O interface 506 which acts as interface for data communication between the processor 501 and an image sensor (30 in FIGS. 1, 2 and 3) and as interface for data communication between the processor 501 and an electric light valve such as an L-COS, a T-LCD, a DMD (40, 41 in FIGS. 1, 2 and 3), and/or for example for communication with a spectrometer 60 to obtain and process a spectral intensity distribution (S(λ) in FIGS. 1, 2, 3, and 4). The circuitry 500 further comprises a user interface 507 (e.g. a keyboard, a mouse or the like), and a display interface 510 (which could for example be a touch screen display or the like) which can be used by a user to manually determine a region of interest, as it is described in the embodiments above.

Figure 7:
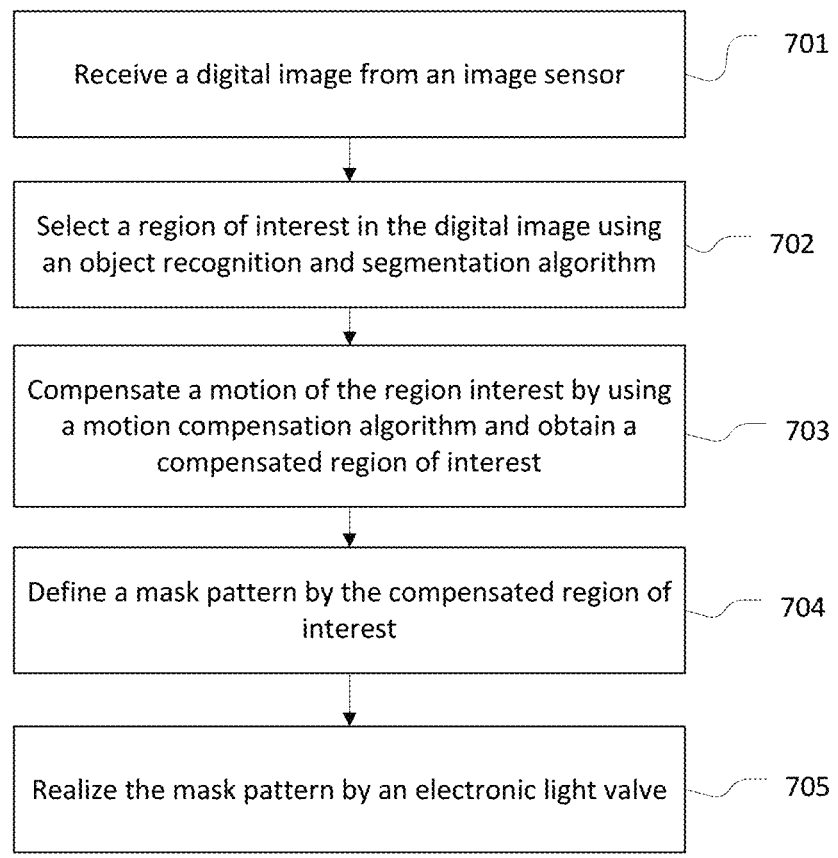
FIG. 7 schematically shows a flow chart of the digital processing, described in FIG. 1, FIG. 3 and FIG. 4.

FIG. 7 schematically shows a flow chart of the digital processing, described in FIG. 1, FIG. 3 and FIG. 4. In 701, a digital image is received from an image sensor. In 702, a region of interest in the digital image is selected using an object recognition and segmentation algorithm. In 703, the motion of the region of interest is compensated by using the motion compensation algorithm and a compensated region of interest is obtained. In 704, a mask pattern is defined by the compensated region of interest In 705, the mask pattern is realized by the electronic valve.

It should also be noted that the division of the circuitry of FIG. 6 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) A device comprising a circuitry configured to obtain a sequence of digital images (1) from an image sensor (30); select a region of interest (ROI) within a digital image (1) of the sequence of digital images (1); perform motion compensation on the region of interest (ROI) to obtain a motion compensated region of interest (ROI-comp) based on motion information (v) obtained from the sequence of digital images (1) and a predefined accumulated time interval (Δt); define a mask pattern (2) based on the compensated region of interest (ROI-comp); apply the mask pattern to an electronic light valve (40, 41).
(2) The device of (1), wherein the circuitry is further configured to obtain spectral intensity distribution data (S(λ)) of light passing through the electronic light valve (40, 41).
(3) The device of (1) or (2), wherein circuitry is configured to select the region of interest (ROI) based on an object recognition and segmentation algorithm.
(4) The device of anyone of (1) to (3), wherein the accumulated time interval (Δt) comprises a time delay caused by processing the digital image (1).
(5) The device of anyone of (1) to (4), wherein the accumulated time interval (Δt) comprises a time delay caused by applying the mask pattern (2) to the electronic light valve (41).
(6) The device of anyone of (1) to (4), wherein the accumulated time interval (Δt) comprises a time delay caused by capturing the digital image (1) and by measuring spectral intensity distribution data (S(λ)) of light passing through the electronic light valve (41).
(7) The device of (4), wherein the time delay caused by processing the digital image (1) comprises a predefined detection time period (T-detect) which relates to the selecting the region of interest (ROI) within the digital image (1), and a predefined compensation time period (T-comp) which relates to the performing motion compensation on the region of interest (ROI).
(8) The device of (5), wherein the time delay caused by applying the mask pattern (2) to the electronic light valve (41) comprises a predefined write time period (T-write), and a predefined rise time period (T-rise).
(9) The device of (6), wherein the time delay caused by capturing the digital image (1) comprises a predefined exposure time period (T-exp), and a predefined readout time period (T-readout), and where the time delay caused by measuring spectral intensity distribution data (S(λ)) of light passing through the electronic light valve (41) comprises an integration time period (T-int).
(10) The device of anyone of (1) to (9), wherein the accumulated time interval (Δt) is a time interval between a first time (t) and a second time (t+Δt), and wherein the accumulated time interval (Δt) is chosen such that the compensated region of interest (ROI-comp) at the second time (t+Δt) covers congruently the same objects from the scene (10) at the second time (t+Δt) as the region of interest (ROI) at the first time (t).
(11) The device of anyone of (1) to (10), wherein the circuitry is configured to define the mask pattern (2) based on the compensated region of interest (ROI-comp) by transforming the pixel information from a pixel space of the image sensor (30) to a pixel space of the electronic light valve (40,41).
(12) The device of (11), wherein the transformation of the compensated region of interest (ROI-comp) from a pixel space of the first image sensor (30) to the pixel space of the electronic light valve, involves one or more image processing operations such as padding, clipping, shifting, up/down sampling, up/down scaling or distortion compensation.
(13) The device of anyone of (1) to (12), further comprising a first lens (21) configured to focus incident electromagnetic radiation onto the image sensor (30), and a second lens (22) configured to focus incident electromagnetic radiation onto the electric light valve (40,41).
(14) The device of anyone of (1) to (14), further comprising a common lens configured to focus incident electromagnetic radiation onto the image sensor (30) and onto the electric light valve (40, 41).
(15) The device of (14), further comprising a beam splitter (70; 71) configured to split the incident electromagnetic radiation from the common (20) lens so that a first part of the split electromagnetic radiation is focused onto the image sensor (30) and a second part of the split electromagnetic radiation is focused onto the electronic light valve (40;41).
(16) The device of anyone of (1) to (15), wherein electronic light valve (40) is a transmissive electronic light valve.
(17) The device of (16), wherein the transmissive electronic light valve is a transmissive liquid crystal micro-display (T-LCD).

(18) The device of anyone of (1) to (14), wherein the electronic light valve (41) is a reflective electronic light valve.

(19) The device of (18), wherein the reflective electronic light valve is a reflective liquid crystal on silicon microdisplay (LCoS), or a digital mirror device (DMD).

(20) The device of (18) or (19), further comprising a polarizing beam splitter (71) configured to split the incident electromagnetic radiation from the common lens (20) so that a first part of the of the split electromagnetic radiation, which is polarized in a first polarization state, is focused onto the image sensor (30) and an second part of the split electromagnetic radiation, which is polarized in a second polarization state which is orthogonal to the first polarization state, is focused onto the reflective electronic light valve (40;41).

(21) The device of (20) wherein the reflective electronic light valve (41) is configured to convert the s-polarized second part of the split electromagnetic radiation into p-polarized electromagnetic radiation and reflect it back to the polarizing beam splitter (71).

(22) The device of (20) or (21), further comprising a spectrometer (60), wherein the reflective electronic light valve (41) and the spectrometer (60) are located on opposite sides of the polarizing beam splitter (71).

(23) A method comprising obtaining a sequence of digital images (1) from an image sensor (30); selecting a region of interest (ROI) within a digital image (1) of the sequence of digital images (1); performing motion compensation on the region of interest (ROI) to obtain a motion compensated region of interest (ROI-comp) based on motion information (v) obtained from the sequence of digital images (1) and a predefined accumulated time interval (Δt); defining a mask pattern (2) based on the compensated region of interest (ROI-comp); applying the mask pattern to an electronic light valve (40, 41).

The invention claimed is:

1. A device comprising:
   a circuitry configured to
      obtain a sequence of digital images from an image sensor,
      select a region of interest within a digital image of the sequence of digital images,
      perform motion compensation on the region of interest to obtain a motion compensated region of interest based on motion information obtained from the sequence of digital images and a predefined accumulated time interval,
      define a mask pattern based on the compensated region of interest, and
      apply the mask pattern to an electronic light valve; and
   a common lens configured to focus incident electromagnetic radiation onto the image sensor and onto the electronic light valve,
   wherein the accumulated time interval comprises a time delay,
   wherein the accumulated time interval is a time interval between a first time and a second time, and
   wherein the accumulated time interval is chosen such that the compensated region of interest at the second time covers congruently the same objects from the scene at the second time as the region of interest at the first time.

2. The device of claim 1, wherein the circuitry is further configured to obtain spectral intensity distribution data of light passing through the electronic light valve.

3. The device of claim 1, wherein the circuitry is configured to select the region of interest based on an object recognition and segmentation algorithm.

4. The device of claim 1, wherein the time delay is caused by processing the digital image.

5. The device of claim 1, wherein the time delay is caused by applying the mask pattern to the electronic light valve.

6. The device of claim 1, wherein the time delay is caused by capturing the digital image and by measuring spectral intensity distribution data of light passing through the electronic light valve.

7. The device of claim 4, wherein the time delay caused by processing the digital image comprises a predefined detection time period which relates to the selecting the region of interest within the digital image, and a predefined compensation time period which relates to the performing motion compensation on the region of interest.

8. The device of claim 5, wherein the time delay caused by applying the mask pattern to the electronic light valve comprises a predefined write time period, and a predefined rise time period.

9. The device of claim 6, wherein the time delay caused by capturing the digital image comprises a predefined exposure time period, and a predefined readout time period, and where the time delay caused by measuring spectral intensity distribution data of light passing through the electronic light valve comprises an integration time period.

10. The device of claim 1, wherein the circuitry is configured to define the mask pattern based on the compensated region of interest by transforming the pixel information from a first pixel space of the image sensor to a second pixel space of the electronic light valve.

11. The device of claim 10, wherein the transformation of the compensated region of interest from the first pixel space of the first image sensor to the second pixel space of the electronic light valve involves one or more image processing operations including padding, clipping, shifting, up/down sampling, up/down scaling, or distortion compensation.

12. The device of claim 1, further comprising:
    a first lens configured to focus the incident electromagnetic radiation onto the image sensor, and
    a second lens configured to focus the incident electromagnetic radiation onto the electronic light valve.

13. The device of claim 1, further comprising a beam splitter configured to split the incident electromagnetic radiation from the common lens so that a first part of the split electromagnetic radiation is focused onto the image sensor and a second part of the split electromagnetic radiation is focused onto the electronic light valve.

14. The device of claim 1, wherein electronic light valve is a transmissive electronic light valve.

15. The device of claim 14, wherein the transmissive electronic light valve is a transmissive liquid crystal microdisplay.

16. The device of claim 1, wherein the electronic light valve is a reflective electronic light valve.

17. The device of claim 16, wherein the reflective electronic light valve is a reflective liquid crystal on silicon micro-display, or a digital mirror device.

18. The device of claim 16, further comprising a polarizing beam splitter configured to split the incident electromagnetic radiation from the common lens so that a first part of the of the split electromagnetic radiation, which is polarized in a first polarization state, is focused onto the image sensor and an second part of the split electromagnetic radiation, which is polarized in a second polarization state which is orthogonal to the first polarization state, is focused onto the reflective electronic light valve.

19. The device of claim 18, wherein the reflective electronic light valve is configured to convert the s-polarized second part of the split electromagnetic radiation into p-polarized electromagnetic radiation and reflect it back to the polarizing beam splitter.

20. The device of claim 18, further comprising a spectrometer, wherein the reflective electronic light valve and the spectrometer are located on opposite sides of the polarizing beam splitter.

21. A method comprising:
 obtaining a sequence of digital images from an image sensor;
 selecting a region of interest within a digital image of the sequence of digital images;
 performing motion compensation on the region of interest to obtain a motion compensated region of interest based on motion information obtained from the sequence of digital images and a predefined accumulated time interval;
 defining a mask pattern based on the compensated region of interest; and
 applying the mask pattern to an electronic light valve,
 wherein the mask pattern is defined based on the compensated region of interest by transforming pixel information from a first pixel space of the image sensor to a second pixel space of the electronic light valve.

22. A device comprising:
 a circuitry configured to
 obtain a sequence of digital images from an image sensor,
 select a region of interest within a digital image of the sequence of digital images,
 perform motion compensation on the region of interest to obtain a motion compensated region of interest based on motion information obtained from the sequence of digital images and a predefined accumulated time interval,
 define a mask pattern based on the compensated region of interest, and
 apply the mask pattern to an electronic light valve; and
 a polarizing beam splitter configured to split incident electromagnetic radiation from a common lens so that a first part of the of the split electromagnetic radiation, which is polarized in a first polarization state, is focused onto the image sensor and a second part of the split electromagnetic radiation, which is polarized in a second polarization state which is orthogonal to the first polarization state, is focused onto the electronic light valve.

* * * * *